United States Patent [19]

Sasayama et al.

[11] Patent Number: 4,756,952
[45] Date of Patent: Jul. 12, 1988

[54] WATER-SWELLABLE CAULKING MATERIAL FOR WATER-LEAKAGE PREVENTION

[75] Inventors: Hiroharu Sasayama, Ageo; Yuji Ishihara, Omiya, both of Japan

[73] Assignee: C.I. Kasei Co., Ltd., Tokyo, Japan

[21] Appl. No.: 720,965

[22] Filed: Apr. 8, 1985

[30] Foreign Application Priority Data

Apr. 11, 1984 [JP] Japan .................................. 59-72028

[51] Int. Cl.$^4$ .............................................. B32B 7/02
[52] U.S. Cl. ..................................... 428/212; 428/501; 428/517; 428/520; 428/522; 428/913
[58] Field of Search ............... 428/520, 522, 212, 913, 428/517, 501

[56] References Cited

U.S. PATENT DOCUMENTS 4,386,172  5/1983  Yoshioka .............................. 523/408

FOREIGN PATENT DOCUMENTS 59062  9/1982  European Pat. Off. ............ 428/520

Primary Examiner—John E. Kittle
Assistant Examiner—P. R. Schwartz
Attorney, Agent, or Firm—Wyatt, Gerber, Shoup and Badie

[57] ABSTRACT

The inventive water-swellable caulking material for water-leakage prevention is of the type formed of a composition comprising a rubbery polymer and a highly water-absorptive resin and useful in the caulking works of a construction joint of concrete. Different from the conventional caulking materials of the type, the inventive caulking material is provided on the surface of a shaped body of the water-swellable composition with a coating film which is impervious to neutral water but exhibits water-permeability when contacted with an alkaline water of an alkalinity such as in an uncured concrete mixture so that the caulking material is prevented from premature or untimely expansion by swelling even when inadvertently contacted with water prior to application to the working site but capable of promptly expanding when contacted with an uncured concrete mixture with alkalinity.

7 Claims, 1 Drawing Sheet

WATER-SWELLABLE CAULKING MATERIAL FOR WATER-LEAKAGE PREVENTION

BACKGROUND OF THE INVENTION

The present invention relates to a water-swellable caulking material for preventing water leakage through a construction or expansion joint of concrete or, more particularly, to a water-swellable caulking material for water-leakage prevention protected on the surface with a temporary water-impervious film so that inadvertent contacting of the caulking material with underground water, rain water and the like neutral water before the application thereof to a construction joint never causes premature or untimely swelling and expansion of the material which can commence only in contact with an alkaline water contained in a concrete mixture as a result of the decreased imperviousness of the temporary water-impervious film by the alkali. The invention also relates to a method of preventing leakage of water through a construction joint by use of the same.

Needless to say, water-leakage preventing caulking materials are very important and widely used in civil engineering and building construction works to prevent leakage of water by filling an interstice responsible to water leakage such as cracks, fissures and intersticial gaps in concrete works, water pipes and joints thereof and the like.

Traditional water-leakage preventing caulking materials are shaped of a water-resistant, readily deformable material as the base such as rubbers, flexible plastics, bituminous materials and the like. These base materials are not free from a problem accompanying the decrease of the resilient elasticity or appearance of the phenomenon of creeping unavoidable in a prolonged service over a long period of time resulting in the loss of accomodation to the changes in the dimensions of interstices to cause water leakage.

As a remedy for the above mentioned problem, water-swellable caulking bodies have been developed and proposed in Japanese Patent Kokai No. 57-108143 and 57-135160 teaching a water-swellable vulcanizate of a composition comprising a highly water-absorptive resin, dienic rubber, vulcanizing agent, vulcanization accelerator, filler, aging retarder and the like or a composite body composed of such a water-swellable vulcanizate and a non-swellable polymeric material such as a vulcanizate of a composition comprising a dienic rubber, vulcanizing agent, vulcanization accelerator, filler, aging retarder and the like. Further, a water-swellable resinous composition is also proposed in Japanese Patent Kokai No. 56-3424 which comprises a thermoplastic synthetic resin having flexibility such as a copolymer of ethylene and vinyl acetate impregnated with a highly water-absorptive resin.

The caulking materials of the above described water-swellable type can provide an efficient means for water-leakage prevention due to the completeness of caulking to fill up the interstices responsible to the leakage of water by virtue of the high swelling pressure produced when the caulking material is contacted with water so that they are very useful along with easiness of application thereof to any interstices. A problem in the water-swellable caulking material is, however, that they are liable to a disadvantage of premature or untimely swelling and expansion with water when they are inadvertently contacted with water such as atmospheric moisture, rain water and condensed dew during storage and transportation or with a small volume of water brought into contact with them by chance in the course of working. When the water-swellable caulking material has been prematurely swollen with water, difficulties are sometimes unavoidable in the application thereof or the caulking material may eventually fall down subsequent to application in addition to the fatal drawback of insufficient caulking pressure leading to leakage of water. Moreover, the swollen water-absorptive resin forming the dispersant phase of the composite caulking body may sometimes fall off the surface of the caulking body so that the water-leakage preventing effect is subject to gradual decrease in the lapse of time.

The above described disadvantages can be overcome to some extent by using a pressure-collapsible protecting web, which may be in the form of a woven or non-woven fabric, formed from an emulsion of a synthetic rubber or resin and having a low mechanical strength in the transverse direction as a covering layer for temporarily preventing permeation of water (see, for example, Japanese Patent Publications Nos. 56-29911 and 58-16054). This method of using a temoporary protecting web, however, involves several problems and disadvantages that the production cost of such a caulking material is necessarily high due to the complicated manufacturing process and the caulking material has low versatility in the shapes as a consequence of the use of a woven or non-woven fabric.

The inventors accordingly have undertaken extensive investigations with an object to provide an inexpensive water-leakage preventing caulking material manufacturable in a simple process without the problems and disadvantages in the prior art caulking materials and previously proposed a caulking body formed of a water-swellable polymeric base material and covered with a coating film of low water permeability formed of a synthetic rubber, such as chloroprene rubbers, nitrile rubbers, styrene-butadiene copolymeric rubbers, chlorosulfonated polyethylenes and the like, or a synthetic resin, such as polyvinylidene chlorides, copolymers of ethylene and vinyl acetate and the like. Although the water-swellable caulking material provided with such a coating film can be manufactured in a simple process and at a low cost, it is not always quite satisfactory in respect of the temporary water-imperviousness or water-imperviousness before use like other caulking materials of the type provided with a coating film for controlling the water permeation in time. For example, premature or untimely swelling and expansion of such a caulking material is sometimes unavoidable when the material is inadvertently contacted with water during storage and transportation as well as in the course of working for construction joint of concrete so that the caulking effect is greatly reduced.

SUMMARY OF THE INVENTION

It is therefore an object of the present invention to provide a water-swellable caulking material for water-leakage prevention temporarily protected with a coating film on the surface and free from premature or untimely swelling and expansion even when it is inadvertently contacted with neutral water such as underground water, rain water and the like but freely swellable or expandable when it is used in a construction joint of concrete works in contact with a concrete mixture.

Thus, the water-swellable caulking material for water-leakage prevention provided by the invention comprises: a shaped body formed of a water-swellable polymeric material or a combination of a water-swellable polymeric material and a non-water-swellable polymeric material; and a coating film formed on the surface of the shaped body and composed of a material which is insoluble in neutral water but at least partly soluble in an aqueous alkaline solution having an alkalinity equal to or higher than the alkalinity of a concrete mixture before hardening.

In particular, it is preferable that the coating film formed on the surface of the shaped body is made of a composite material comprising an alkali-soluble material as a dispersant in the matrix of a water-insoluble polymeric material.

DETAILED DESCRIPTION OF THE PREFERRED EMBODIMENTS

Figure 1:
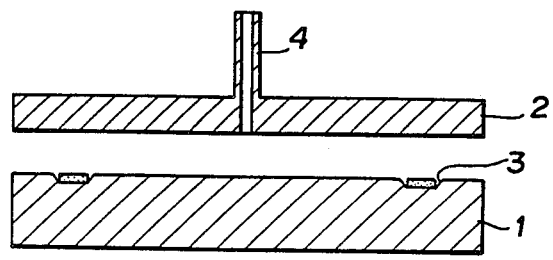
FIG. 1 is a vertical cross sectional view of the jig used in the test of water leakage prevention in Example 3 with a test piece set therein.

By virtue of the temporary protecting coating film on the surface, which is impervious to water and insoluble in neutral water, the water-swellable caulking material is safe from premature or untimely swelling and expansion even when it is inadvertently contacted with underground water, rain water and other neutral water before use or application to a construction or expansion joint but it exhibits water-swellability when brought into contact with a concrete mixture having alkalinity as a result of the at least partial dissolution of the coating film in the alkaline water so that the effect of water-leakage prevention can be obtained with high stability and reliability.

The shaped body as the base of the inventive caulking material is formed of a water-swellable polymeric material or, alternatively, of a combination of a water-swellable polymeric material and a material not swellable in water when reinforcement is desired of the shaped body. The water-swellable polymeric material is exemplified by rubbery blends comprising natural rubber (NR) or a synthetic rubber, such as a synthetic cis-1,4-polyisoprene rubber (IR), polybutadiene rubber (BR), random-copolymerized rubber of styrene and a dienic monomer (SBR or SIR), copolymeric rubber of acrylonitrile and a dienic monomer (NBR or NIR), chloroprene rubber (CR), copolymeric rubber of isobutylene and isoprene (IIR), ternary copolymeric rubber of ethylene, propylene and a dienic monomer (EPDM), poly(trans-1,4-isoprene) rubber, block-copolymerized rubber of styrene and a dienic monomer and the like, highly water absorptive resin, vulcanizing agent, vulcanization accelerator, filler, aging retarder and the like. Alternatively, the water-swellable polymeric material may be a blend of a synthetic resin having flexibility, such as chlorinated polyethylenes, copolymers of ethylene and vinyl acetate, plasticized polyvinyl chloride resins, polyurethanes and the like, with a highly water-absorptive resin and other additives. The water-swellable polymeric material is shaped into a desired form by compression molding, extrusion molding or other known method.

A variety of polymeric materials can be named as the highly water-absorptive resin including those based on starch and polyacrylic acid, crosslinked materials of a polyacrylic acid salt obtained by the reversed-phase polymerization in an organic solvent, crosslinked materials of the product obtained by the reaction of polyacrylic acid or a copolymer of maleic anhydride with a basic compound and the like available on the market. Preferable among them from the standpoint of obtaining a highly water-swellable and durable caulking material are the highly water-absorptive resins obtained by crosslinking a polymer comprising at least one monomeric constituent which is an $\alpha$, $\beta$-unsaturated compound having one or two carboxyl groups or groups convertible to carboxyl groups in a molecule by use of a crosslinking agent.

The material not swellable in water and used in combination with the above described water-swellable material to form a composite is exemplified, for example, by the polymeric materials prepared with the same formulation as for the water-swellable polymeric material with omission of the highly water absorptive resin such as the vulcanizates of a rubbery blend of a dienic rubber with a vulcanizing agent, vulcanization accelerator, filler, aging retarder and the like and the synthetic resins having flexibility such as chlorinated polyethylenes.

The coating film formed on the surface of the above described water-swellable substrate body to exhibit temporary water-imperviousness is made of a material insoluble in neutral water but at least partly soluble in alkaline water of such an alkalinity as in an uncured concrete mixture. It is not always necessary that the coating film is formed of a material having such a solubility behavior alone but the coating film is preferably formed of a composite composed of such a water-insoluble but alkali-soluble material dispersed in a matrix of a material insoluble both in neutral water and in alkaline water such as water-insoluble polymeric materials including synthetic resins, synthetic rubbers and natural rubber in view of the film-formability of the material on the substrate surface as well as the controllability of the rate of water absorption and durability of the caulking effect obtained with the inventive caulking material.

The material insoluble in neutral water but soluble in alkaline water is exemplified by a variety of organic and inorganic materials including, for example, weakly acidic polymer electrolytes such as copolymers of a lower olefin or styrene and maleic anhydride, poly(acrylic acid), poly(methacrylic acid) and the like, poly(acrylic acid esters), poly(methacrylic acid esters), alkali-soluble inorganic compounds such as aluminum phosphate, basic zinc carbonate and the like, powders of amphoteric metals such as aluminum and the like, and others. Particularly preferable are the polymer electrolytes such as the copolymers of maleic anhydride.

The water-insoluble polymeric material forming the matrix for the above mentioned alkali-soluble materials as the dispersant in the coating film includes the same rubbers and resins used in the preparation of the water-swellable substrate body of the inventive caulking material. Particularly preferable are chlorinated polyethylenes, chloroprene rubbers, nitrile rubbers and the like in view of the good adhesion of the coating film to the surface of the substrate body and the flexibility of the coating film which should desirably be in the same degree as in the substrate body.

When the temporary water-impervious coating film is made of a composite of the above described two types of the materials, the amount of the water-insoluble but alkali-soluble substance should be in the range from 5 to 150 parts by weight or, preferably, from 10 to 100 parts by weight per 100 parts by weight of the water-insoluble polymeric material forming the matrix of the coating film. The thickness of the coating film should be determined of course in consideration of various parameters such as the type and amount of the water-insoluble but alkali-soluble material in the coating film but it is usually in the range from 5 to 500 μm or, preferably, from 20 to 300 μm. When the thickness of the coating film is too small, the desired temporary water-imperviousness cannot be obtained as a matter of course. When the thickness of the temporary water-impervious coating film is too large, on the other hand, exhibition of the water permeability of the coating film after application of the caulking material to a construction joint of concrete would be unduly delayed to cause loss of practicability.

The here implied neutrality of water against which the coating film should retain the water imperviousness should not be construed to be in a too narrow range including a pH of exactly 7 but the neutrality includes any weak acidity and alkalinity which naturally occurring water may have with a possibility of contacting with the inventive caulking material during storage and transportation as well as in the site where the caulking material is used. For example, the coating film should withstand desirably a pH in the range from 5 to 9 of the water coming into contact therewith. The alkaline water here implied in which the coating film should be at least partly dissolved to exhibit permeability to water should have an alkalinity of a pH definitely larger than the pH of the above mentioned neutrality or a pH never or rarely encountered in natural water. For example, a 2:1 by weight mixture of a portland cement having about 0.5 to 1.0% of the total alkali and water has a pH in the range from about 13.5 to about 13.8 and most of uncured concrete mixtures have a pH within or in the vicinity of this range. Accordingly, the water-insoluble but alkali-soluble material should be soluble desirably in an alkaline water of a pH of, for example, 11 or higher.

Formation of the temporary water-impervious coating film on the water-swellable substrate body can be performed in several different ways. For example, the substrate body is coated with a solution or emulsion containing the film-forming material comprising the water-insoluble but alkali-soluble material by dipping therein or spraying therewith followed by drying. Control of the film thickness in these cases can readily be performed by using a solution or emulsion containing the film-forming material in an appropriate concentration. In this regard, solutions are preferable to emulsions. Alternatively, the technique of co-extrusion is applicable to the combination of the water-swellable composite material for the substrate body as the core and the water-insoluble but alkali-soluble material or a composite comprising the same as the surface layer.

Advantageously different from conventional surface-protected water-swellable caulking materials for water leakage prevention in which the balance between the water-imperviousness before application and water-permeability after application is essential of the coating film, the inventive caulking material can be imparted with water-imperviousness as high as desired before application and can rapidly exhibit water-permeability after application to cause swelling and expansion of the water-swellable substrate body. Moreover, the production process of the inventive caulking material is very simple and efficient with outstandingly low production costs comprising only the step of directly forming a coating film on the surface of the water-swellable substrate body. It is of course that the temporary water-imperviousness of the coating film can freely be controlled by modifying the thickness of the film. In addition, there is no or little limitation in the form of the inventive caulking material since the caulking material can be prepared in a process for providing a coating film on the surface of a substrate body by dipping in a solution or emulsion or by the technique of co-extrusion. These features are only a part of the advantages obtained with the inventive caulking material for water leakage prevention.

When the coating film on the substrate body is formed of a composite composed of a water-insoluble but alkali-soluble material as a dispersant in the matrix of a film-forming, water-insoluble polymeric material, an additional advantage obtained therewith is that the coating film retains the form of the protecting film even after the water-insoluble but alkali-soluble material as the dispersant therein has been dissolved away in contact with an alkaline uncured concrete mixture so that the highly water-absorptive resin contained and dispersed in the water swellable substrate body can be effectively prevented from falling off contributing to the long-term stabilization of the water leakage preventing effect synergistically in combination with the decrease in the water swellability due to the metallic ions, e.g. calcium ions, contained in the concrete mixture.

It is of course optional that, when a prompt appearance of the water permeability of the coating film is desired after the caulking material with a full power of temporary water-imperviousness of the coating film is applied to a concrete joint, the caulking material is subjected to a pre-treatment in advance of the application thereof to a joint with a sufficiently alkaline solution to leach out the water-insoluble but alkali-soluble material contained in the coating film as a dispersant therein. When the coating film is formed of a water-insoluble but alkali-soluble material alone, this pre-treatment of the inventive caulking material with an alkaline solution may result in the complete removal of the coating film so that the swelling and expansion of the caulking material in contact with water can be as rapid as in conventional unprotected water-swellable caulking materials.

Following are the examples and comparative examples to illustrate the present invention in more detail but not to limit the scope of the invention in any way. The swelling ratio by weight given in the following is a value obtained by dividing the weight of the caulking body swollen after dipping in water by the weight of the same body before dipping in water.

EXAMPLE 1

The substrate body was a composite square plate of 20 mm by 20 mm wide and 1.8 mm thick, of which the 10 mm by 10 mm square center portion was formed of a water-swellable compound composed of 100 parts by weight of a chlorinated polyethylene (Daisolac G235, a product by Osaka Soda Co.) as the water-insoluble rubbery material and 60 parts by weight of a highly water-absorptive resin (KI Gel 201, a product by Kuraray Isoprene Chemical Co.), which was a crosslinked copolymer of isobutylene and maleic anhydride, surrounded by a frame-like portion formed of the same chlorinated polyethylene alone.

The above described plate-like substrate body was provided on both surfaces by press-bonding each with a pre-formed partially alkali-soluble film of a compounded material having a thickness of 0.1 mm composed of 100 parts by weight of the same chlorinated polyethylene as used above and 60 parts by weight of a copolymer of isobutylene and maleic anhydride (Isoban 104, a product by Kuraray Isoprene Chemical Co.) to give a surface-protected water-swellable body having an overall thickness of 2.0 mm.

Pieces of the thus prepared water-swellable specimens were subjected to a test of the swelling ratio by weight in water for a length of time up to 30 days either by dipping the test piece as such in running city water (test condition A) or by dipping, in running city water, the test piece taken out of a 30 cm by 30 cm by 5 cm block shaped of a mortar mixture after dipping in running city water for 3 days following a setting period of 3 days with the test piece as embedded in about the middle portion thereof (test condition B). The results of the swelling ratio obtained in these tests are shown in Table 1 to follow for each of the dipping periods and the test conditions.

EXAMPLE 2

The experimental procedure was substantially the same as in Example 1 except that the highly water-absorptive resin KI Gel 201 was replaced with the same amount of another highly water-absorptive resin (Sumikagel SP-520, a product by Sumitomo Kagaku Kogyo Co.), which was a saponified copolymer of vinyl acetate and an acrylic acid salt, and 60 parts by weight of the copolymer of isobutylene and maleic anhydride in the formulation of the partially alkali-soluble surface-protecting film were replaced with 20 parts by weight of a copolymer of ethylene and maleic anhydride (EMA 61, a product by Monsanto Co.). The results of the swelling ratio by weight obtained under the test conditions A and B are shown in Table 1.

COMPARATIVE EXAMPLE 1

The experimental procedure was substantially the same as in Example 1 but no surface-protecting film was provided on each surface of the water-swellable substrate plate as the test piece. The results of the swelling ratio by weight obtained under the test conditions A and B are shown in Table 1.

COMPARATIVE EXAMPLE 2

The experimental procedure was substantially the same as in Example 2 but no surface-protecting film was provided on each surface of the water-swellable substrate plate as the test piece. The results of the swelling ratio by weight obtained under the test conditions A and B are shown in Table 1.

COMPARATIVE EXAMPLE 3

The experimental procedure was substantially the same as in Example 2 except that the partially alkalisoluble surface-protecting film was replaced with a film of the same thickness formed of a compound composed of 100 parts by weight of the same chlorinated polyethylene as used in Example 2 and 30 parts by weight of the same highly water-absorptive resin as used in the waterswellable substrate plate in the form of a dispersant in the chlorinated polyethylene as the matrix. The results of the swelling ratio by weight obtained under the test conditions A and B are shown in Table 1.

TABLE 1

| Example No. | Example 1 | | Example 2 | | Comparative Example 1 | | Comparative Example 2 | | Comparative Example 3 | |
|---|---|---|---|---|---|---|---|---|---|---|
| Test condition | A | B | A | B | A | B | A | B | A | B |
| As taken out | — | 1.1 | — | 1.1 | — | 2.2 | — | 2.2 | — | 2.1 |
| Days of dipping in water  1 | 1.0 | 2.6 | 1.0 | 1.2 | 7.2 | 4.6 | 4.4 | 3.3 | 2.7 | 3.0 |
| 3 | 1.0 | 6.4 | 1.0 | 1.7 | 6.5 | 4.3 | 5.5 | 2.5 | 5.1 | 5.1 |
| 5 | 1.0 | 7.1 | 1.0 | 2.3 | 4.5 | 3.1 | 4.9 | 2.3 | 6.1 | 6.4 |
| 10 | 1.0 | 5.3 | 1.3 | 3.7 | 3.9 | 2.2 | 4.0 | 2.3 | 5.7 | 6.7 |
| 15 | 1.0 | 3.9 | 1.6 | 4.7 | 3.8 | 2.1 | 4.0 | 2.3 | 5.3 | 5.9 |
| 20 | 1.0 | 3.8 | 1.9 | 5.4 | 3.8 | 2.1 | 4.0 | 2.3 | 5.2 | 5.4 |
| 25 | 1.0 | 3.7 | 2.3 | 5.9 | 3.8 | 2.1 | 4.0 | 2.3 | 5.1 | 5.0 |
| 30 | 1.0 | 3.7 | 2.7 | 6.4 | 3.7 | 2.0 | 4.0 | 2.3 | 5.1 | 4.8 |

As is understood from the results shown in Table 1, the water-swellable caulking material of the invention is very effectively prevented from expansion by swelling when it is contacted with city water while the water-swellability is promptly regained to exhibit a full swelling pressure after it is contacted with and embedded in a concrete mixture. The swelling ratio by weight at about equilibrium is 1.9 times larger in Example 1 than in Comparative Example 1 and 2.8 times larger in Example 2 than in Comparative Example 2. This fact evidences that the swelling of the inventive caulking material is little influenced by the metallic ions in the concrete mixture such as calcium ions so that much larger stability can be obtained in the water leakage preventing power with the inventive caulking material than with conventional caulking materials without the partially alkali-soluble surface-protecting film on the surface.

EXAMPLE 3

Water-swellable caulking bodies each in a square frame-like form having an outer side length of 320 mm, an inner side length of 270 mm and a thickness of 7 mm were prepared by adhesively combining coextruded bars of a water-swellable composition composed of 70 parts by weight of a chlorinated polyethylene (Daisolac RA 135, a product by Osaka Soda Co.), 30 parts by weight of a highly water absorptive resin (KI Gel 201, supra) and 30 parts by weight of a polyisobutylene (Vistanex MML-80, a product by Exon Chemical Co.) having a coating layer of 0.2 mm thickness for temporary protection over the whole surface formed of a partially alkali-soluble composition composed of 70 parts by weight of the same chlorinated polyethylene as above as the matrix and 100 parts by weight of a copolymer of isobutylene and maleic anhydride (Isoban 04, supra) as the dispersant in the matrix.

Figure 2:
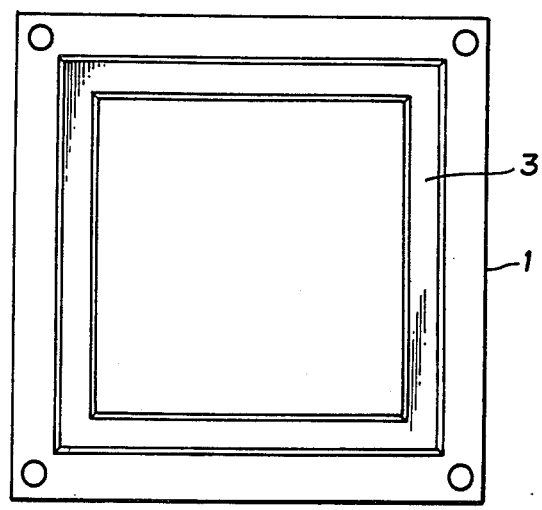
FIG. 2 is a plan view of the body of the same jig.

The caulking bodies were coated by brushing with an alkali solution prepared by dissolving 5 g of sodium hydroxide and 25 g of polyethylene oxide (PEO 18, a product by Seitetsu Kagaku Kogyo Co.) in 100 ml of water (alkali solution I) or 10 g of sodium hydroxide and 30 g of Isoban 104 (supra) in 100 ml of water (alkali solution II) to at least partially dissolve away the alkali-soluble dispersant in the coating film. The thus alkali-treated caulking body was set in a testing jig shown in FIGS. 1 and 2 provided with a square frame-like groove 3 having a depth of 7 mm to just receive the caulking body with the cover 2 laid thereon keeping no or a varied gap of 1, 2 or 3 mm with the body 1 of the jig by use of a spacer (not shown in the figures) and, after standing as such for 24 hours, a water pressure of 0, 1, 2 or 3 kg/cm$^2$G was applied thereto through the nozzle 4 to determine the length of time in days when complete prevention of water leakage was obtained by the swelling of the caulking body. The results are shown in Table 2. When the caulking body was used without the alkali-treatment, no leakage preventing effect was obtained even after 33 days or 26 days when the water pressure was 2 or 3 kg/cm$^2$G or when the gap was kept at 1 mm or larger. As is clear from these results, the pretreatment of the inventive caulking body with an alkali solution has an effect to greatly decrease the length of time taken for the exhibition of the caulking effect by the swelling of the caulking body.

TABLE 2

| Alkali solution | Gap, mm | Water pressure, kg/cm$^2$ G | | | |
|---|---|---|---|---|---|
| | | 0 | 1 | 2 | 3 |
| I | 0 | 14 | 16 | 16 | 16 |
| | 1 | 19 | 20 | 20 | 22 |
| | 2 | 23 | 25 | 25 | 26 |
| | 3 | 28 | 28 | 29 | 33 |
| II | 0 | 5 | 5 | 5 | 6 |
| | 1 | 8 | 8 | 9 | 12 |
| | 2 | 15 | 15 | 16 | 17 |
| | 3 | 19 | 21 | 21 | 26 |

What is claimed is:

1. A water-swellable caulking material for water-leakage prevention which comprises:
   (a) a shaped body of a material capable of expanding by swelling with water; and
   (b) a coating film provided on at least a part of the surface of the shaped body, which is impervious to neutral water but at least partly soluble in an alkaline water so that permeability to water is imparted thereto in contact with an alkaline water.

2. The water-swellable caulking material as claimed in claim 1 wherein the coating film is formed of a composition comprising a water-insoluble film-forming polymeric substance as a matrix and a substance which is insoluble in neutral water but soluble in an alkaline water as a dispersant in the matrix.

3. The water-swellable caulking material as claimed in claim 1 wherein the coating film is insoluble in water having a value of pH in the range from 5 to 9 but at least partly soluble in an alkaline water having a value of pH of 11 or higher.

4. The water-swellable caulking material as claimed in claim 1 wherein the material forming the shaped body is a composition comprising a water-insoluble rubbery polymer and a highly water-absorptive resin.

5. The water-swellable caulking material as claimed in claim 2 wherein the substance insoluble in neutral water but soluble in an alkaline water is a weakly acidic synthetic polymer electrolyte.

6. The water-swellable caulking material as claimed in claim 2 wherein the amount of the dispersant in the coating film is in the range from 5 to 150 parts by weight per 100 parts by weight of the matrix.

7. The water-swellable caulking material as claimed in claim 1 wherein the coating film has a thickness in the range from 5 to 500 μm.

* * * * *